United States Patent
Avci et al.

(10) Patent No.: US 12,499,986 B2
(45) Date of Patent: Dec. 16, 2025

(54) MACHINE LEARNING MODEL BASED SYSTEMS AND METHODS FOR PROVIDING ASSISTANCE FOR A LEAD INSERTION PROCEDURE

(71) Applicant: Advanced Bionics AG, Staefa (CH)

(72) Inventors: Ersin Avci, Isernhagen (DE); Tim Nauwelaers, Hannover (DE); Volkmar Hamacher, Hannover (DE); Pierre Guillon, Stäfa (CH)

(73) Assignee: Advanced Bionics AG, Staefa (CH)

( * ) Notice: Subject to any disclaimer, the term of this patent is extended or adjusted under 35 U.S.C. 154(b) by 983 days.

(21) Appl. No.: 17/634,101

(22) PCT Filed: Aug. 20, 2020

(86) PCT No.: PCT/IB2020/057844
§ 371 (c)(1),
(2) Date: Feb. 9, 2022

(87) PCT Pub. No.: WO2021/038400
PCT Pub. Date: Mar. 4, 2021

(65) Prior Publication Data
US 2022/0367028 A1  Nov. 17, 2022

Related U.S. Application Data

(60) Provisional application No. 62/891,264, filed on Aug. 23, 2019.

(51) Int. Cl.
*G16H 20/40* (2018.01)
*A61B 34/00* (2016.01)
*A61B 34/10* (2016.01)

(52) U.S. Cl.
CPC ............. *G16H 20/40* (2018.01); *A61B 34/10* (2016.02); *A61B 34/25* (2016.02); *A61B 2034/105* (2016.02); *A61B 2034/252* (2016.02)

(58) Field of Classification Search
CPC . A61N 1/0541; A61N 1/36038–36039; G16H 20/40; A61B 34/10;
(Continued)

(56) References Cited

U.S. PATENT DOCUMENTS 5,824,022 A  10/1998  Zilberman et al.
8,073,216 B2  12/2011  Dawant et al.
(Continued)

FOREIGN PATENT DOCUMENTS

EP  2953543  4/2019
WO  2013166098  11/2013
(Continued)

OTHER PUBLICATIONS

"International Search Report and Written Opinion received in International Application No. PCT/IB2020/057844."
(Continued)

*Primary Examiner* — Thaddeus B Cox
(74) *Attorney, Agent, or Firm* — ALG Intellectual Property, LLC

(57) ABSTRACT

An illustrative insertion management system may be configured to provide, as a first input to a machine learning model, geometric model data specific to a recipient of a cochlear implant and representative of a geometrical model of a cochlea of the recipient, provide, as a second input to the machine learning model, procedure data representative of one or more contextual attributes of a lead insertion procedure in which an electrode lead is inserted to the cochlea of the recipient, and generate, based on an output of the machine learning model that takes into account the geometric model data and the procedure data, procedure assistance data configured to assist a user in performing the lead insertion procedure.

17 Claims, 15 Drawing Sheets

(58) Field of Classification Search
CPC ... A61B 2034/101–108; A61B 2034/252–258; A61F 11/045
See application file for complete search history.

(56) References Cited

U.S. PATENT DOCUMENTS

| | | |
|---|---|---|
| 9,589,361 B2 | 3/2017 | Reda et al. |
| 2010/0114288 A1 | 5/2010 | Haller et al. |
| 2011/0191275 A1 | 8/2011 | Lujan |
| 2016/0096013 A1 | 4/2016 | Tortonese et al. |
| 2017/0135764 A1 | 5/2017 | Gliner et al. |
| 2017/0157400 A1 | 6/2017 | Noble et al. |
| 2018/0150983 A1 | 5/2018 | Gliner et al. |

FOREIGN PATENT DOCUMENTS

| | | |
|---|---|---|
| WO | 2015054149 | 4/2015 |
| WO | 2015116994 | 8/2015 |
| WO | 2019045680 | 3/2019 |

OTHER PUBLICATIONS

Crowson, et al., "Machine Learning and Cochlear Implantation—A Structured Review of Opportunities and Challenges", Otology and Neurology, Oct. 2019, DOI: 10.1097/MAO.0000000000002440.

Gao, et al., "Modeling Electrode Place Discrimination in Cochlear Implant Stimulation", DOI 10.1109/TBME.2016.2634461, IEEE Transactions on Biomedical Engineering, 2016.

MACHINE LEARNING MODEL BASED SYSTEMS AND METHODS FOR PROVIDING ASSISTANCE FOR A LEAD INSERTION PROCEDURE

RELATED APPLICATIONS

The present application claims priority to U.S. Provisional Patent Application No. 62/891,264, filed Aug. 23, 2019, the contents of which are hereby incorporated by reference in their entirety.

BACKGROUND INFORMATION

Correct insertion and placement of an electrode lead within a cochlea for use with a cochlear implant is of great importance for effective electrical stimulation and effective use of the cochlear implant. For example, it is important for the electrode lead to stay within the scala tympani of the cochlea, to be oriented correctly, and to minimize trauma to intracochlear structures so as to preserve any residual hearing that a cochlear implant recipient may have.

A successful outcome for a lead insertion procedure is dependent on a number of different factors, such as the size and shape of a particular recipient's cochlea and/or other recipient-specific physiological characteristics, intraoperative decisions (e.g., related to insertion speed, angle, and/or depth) made by a surgeon performing the lead insertion procedure, and characteristics of the particular type of electrode lead being inserted into the cochlea. Many of these factors are interdependent. For example, the size and shape of a particular recipient's cochlea, in combination with an amount of the recipient's residual hearing, may affect an optimal insertion speed, angle, and/or depth. It can therefore be difficult or impossible for a surgeon to take all of these factors into account when making a plan for the lead insertion procedure and/or while making intraoperative decisions in real time during the lead insertion procedure.

BRIEF DESCRIPTION OF THE DRAWINGS

The accompanying drawings illustrate various embodiments and are a part of the specification. The illustrated embodiments are merely examples and do not limit the scope of the disclosure, Throughout the drawings, identical or similar reference numbers designate identical or similar elements.

DETAILED DESCRIPTION

Machine learning model based systems and methods for providing assistance for a lead insertion procedure during which an electrode lead is inserted into a recipient of a cochlear implant are described herein. For example, an insertion management system may be configured to provide, as a first input to a machine learning model, geometric model data specific to a recipient of a cochlear implant and representative of a geometrical model of a cochlea of the recipient, provide, as a second input to the machine learning model, procedure data representative of one or more contextual attributes of a lead insertion procedure in which an electrode lead is inserted to the cochlea of the recipient, and generate, based on an output of the machine learning model that takes into account the geometric model data and the procedure data, procedure assistance data configured to assist a user in performing the lead insertion procedure.

The machine learning model based systems and methods described herein may provide many benefits and advantages compared to conventional approaches to lead insertion procedures. For example, the systems and methods described herein may provide a user (e.g., a surgeon and/or other personnel involved in the lead insertion procedure) with a predictive intraoperative measurement profile for the recipient and/or one or more recommendations for performing the insertion procedure. Such information may be provided preoperatively and/or intraoperatively, which may allow the user to make a plan specific to the recipient that ensures or maximizes a chance of the lead insertion procedure being a success and then make optimizing adjustments to the plan in real time during the lead insertion procedure. Moreover, by training the machine learning model with historical data associated with a host of already performed lead insertion procedures, the machine learning model may learn how to predict what an optical combination of lead insertion parameters might be for a particular cochlear implant recipient based on the recipient's particular physiological characteristics, tendencies of the surgeon performing the lead insertion procedure, and/or any other factor associated with the lead insertion procedure. These and other benefits and advantages of the systems and methods described herein will be made apparent herein.

Figure 1:
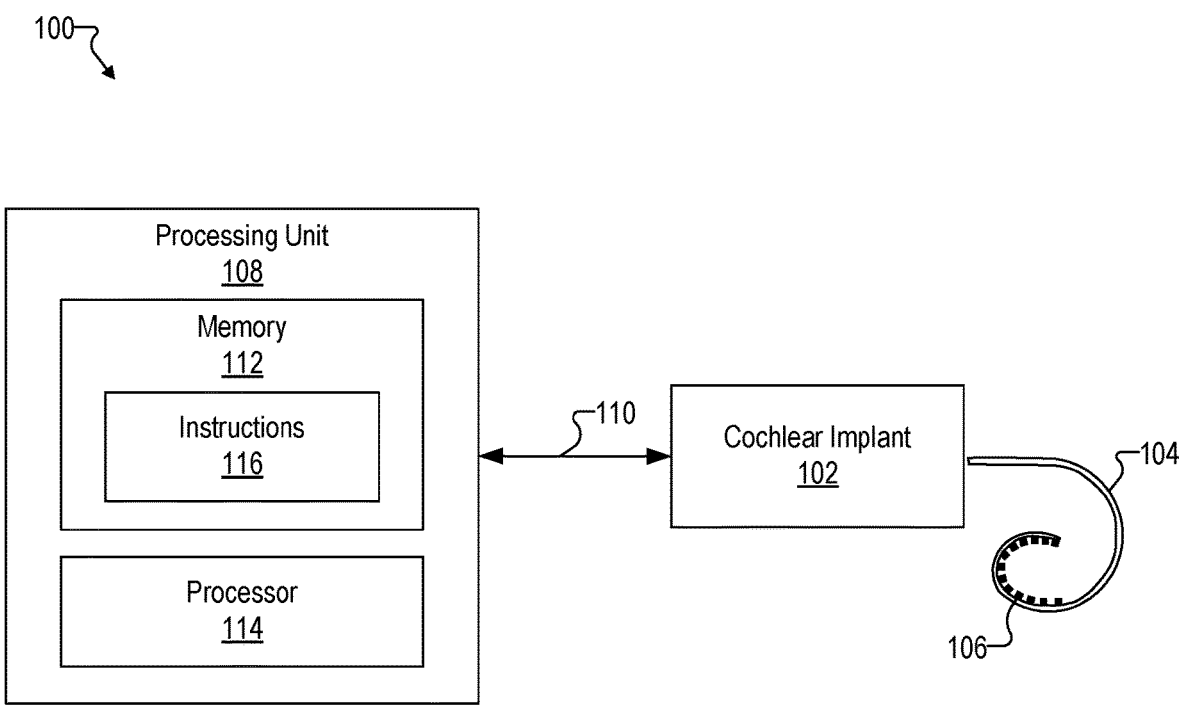
FIG. 1 illustrates an exemplary cochlear implant system.

FIG. 1 illustrates an exemplary cochlear implant system 100 configured to be used by a recipient. As shown, cochlear implant system 100 includes a cochlear implant 102, an electrode lead 104 physically coupled to cochlear implant 102 and having an array of electrodes 106, and a processing unit 108 configured to be communicatively coupled to cochlear implant 102 by way of a communication link 110.

The cochlear implant system 100 shown in FIG. 1 is unilateral (i.e., associated with only one ear of the recipient). Alternatively, a bilateral configuration of cochlear implant system 100 may include separate cochlear implants and electrode leads for each ear of the recipient. In the bilateral configuration, processing unit 108 may be implemented by a single processing unit configured to interface with both cochlear implants or by two separate processing units each configured to interface with a different one of the cochlear implants.

Cochlear implant 102 may be implemented by any suitable type of implantable stimulator. For example, cochlear implant 102 may be implemented by an implantable cochlear stimulator. Additionally or alternatively, cochlear implant 102 may be implemented by a brainstem implant and/or any other type of device that may be implanted within the recipient and configured to apply electrical stimulation to one or more stimulation sites located along an auditory pathway of the recipient.

In some examples, cochlear implant 102 may be configured to generate electrical stimulation representative of an audio signal (also referred to herein as audio content) processed by processing unit 108 in accordance with one or more stimulation parameters transmitted to cochlear implant 102 by processing unit 108. Cochlear implant 102 may be further configured to apply the electrical stimulation to one or more stimulation sites (e.g., one or more intracochlear locations) within the recipient by way of one or more electrodes 106 on electrode lead 104. In some examples, cochlear implant 102 may include a plurality of independent current sources each associated with a channel defined by one or more of electrodes 106. In this manner, different stimulation current levels may be applied to multiple stimulation sites simultaneously by way of multiple electrodes 106.

Cochlear implant 102 may additionally or alternatively be configured to generate, store, and/or transmit data. For example, cochlear implant may use one or more electrodes 106 to record one or more signals (e.g., one or more voltages, impedances, evoked responses within the recipient, and/or other measurements) and transmit, by way of communication link 110, data representative of the one or more signals to processing unit 108. In some examples, this data is referred to as back telemetry data.

Electrode lead 104 may be implemented in any suitable manner. For example, a distal portion of electrode lead 104 may be pre-curved such that electrode lead 104 conforms with the helical shape of the cochlea after being implanted. Electrode lead 104 may alternatively be naturally straight or of any other suitable configuration.

In some examples, electrode lead 104 includes a plurality of wires (e.g., within an outer sheath) that conductively couple electrodes 106 to one or more current sources within cochlear implant 102. For example, if there are n electrodes 106 on electrode lead 104 and n current sources within cochlear implant 102, there may be n separate wires within electrode lead 104 that are configured to conductively connect each electrode 106 to a different one of the n current sources. Exemplary values for n are 8, 12, 16, or any other suitable number.

Electrodes 106 are located on at least a distal portion of electrode lead 104. In this configuration, after the distal portion of electrode lead 104 is inserted into the cochlea, electrical stimulation may be applied by way of one or more of electrodes 106 to one or more intracochlear locations. One or more other electrodes (e.g., including a ground electrode, not explicitly shown) may also be disposed on other parts of electrode lead 104 (e.g., on a proximal portion of electrode lead 104) to, for example, provide a current return path for stimulation current applied by electrodes 106 and to remain external to the cochlea after the distal portion of electrode lead 104 is inserted into the cochlea. Additionally or alternatively, a housing of cochlear implant 102 may serve as a ground electrode for stimulation current applied by electrodes 106.

Processing unit 108 may be configured to interface with (e.g., control and/or receive data from) cochlear implant 102. For example, processing unit 108 may transmit commands (e.g., stimulation parameters and/or other types of operating parameters in the form of data words included in a forward telemetry sequence) to cochlear implant 102 by way of communication link 110. Processing unit 108 may additionally or alternatively provide operating power to cochlear implant 102 by transmitting one or more power signals to cochlear implant 102 by way of communication link 110. Processing unit 108 may additionally or alternatively receive data from cochlear implant 102 by way of communication link 110. Communication link 110 may be implemented by any suitable number of wired and/or wireless bidirectional and/or unidirectional links.

As shown, processing unit 108 includes a memory 112 and a processor 114 configured to be selectively and communicatively coupled to one another. In some examples, memory 112 and processor 114 may be distributed between multiple devices and/or multiple locations as may serve a particular implementation.

Memory 112 may be implemented by any suitable non-transitory computer-readable medium and/or non-transitory processor-readable medium, such as any combination of non-volatile storage media and/or volatile storage media. Exemplary non-volatile storage media include, but are not limited to, read-only memory, flash memory, a solid-state drive, a magnetic storage device (e.g., a hard drive), ferroelectric random-access memory ("RAM"), and an optical disc. Exemplary volatile storage media include, but are not limited to, RAM (e.g., dynamic RAM).

Memory 112 may maintain (e.g., store) executable data used by processor 114 to perform one or more of the operations described herein as being performed by processing unit 108, For example, memory 112 may store instructions 116 that may be executed by processor 114 to perform any of the audio content processing and cochlear implant control operations described herein, Instructions 116 may be implemented by any suitable application, program (e.g., sound processing program), software, code, and/or other executable data instance. Memory 112 may also maintain any data received, generated, managed, used, and/or transmitted by processor 114.

Processor 114 may be configured to perform (e.g., execute instructions 116 stored in memory 112 to perform) various operations with respect to cochlear implant 102.

To illustrate, processor 114 may be configured to control an operation of cochlear implant 102. For example, processor 114 may receive an audio signal (e.g., by way of a microphone communicatively coupled to processing unit 108, a wireless interface (e.g., a Bluetooth interface), and/or a wired interface (e.g., an auxiliary input port)), Processor 114 may process the audio signal in accordance with a sound processing strategy (e.g., a sound processing program stored in memory 112) to generate appropriate stimulation parameters. Processor 114 may then transmit the stimulation parameters to cochlear implant 102 to direct cochlear implant 102 to apply electrical stimulation representative of the audio signal to the recipient.

In some implementations, processor 114 may also be configured to apply acoustic stimulation to the recipient. For example, a receiver (also referred to as a loudspeaker) may be optionally coupled to processing unit 108. In this configuration, processor 114 may deliver acoustic stimulation to the recipient by way of the receiver. The acoustic stimulation may be representative of an audio signal (e.g., an amplified version of the audio signal), configured to elicit an evoked response within the recipient, and/or otherwise configured. In configurations in which processor 114 is configured to both deliver acoustic stimulation to the recipient and direct cochlear implant 102 to apply electrical stimulation to the recipient, cochlear implant system 100 may be referred to as a bimodal hearing system and/or any other suitable term.

Processor 114 may be additionally or alternatively configured to receive and process data generated by cochlear implant 102. For example, processor 114 may receive data representative of a signal recorded by cochlear implant 102 using one or more electrodes 106 and, based on the data, adjust one or more operating parameters of processing unit 108. Additionally or alternatively, processor 114 may use the data to perform one or more diagnostic operations with respect to cochlear implant 102 and/or the recipient.

Other operations may be performed by processor 114 as may serve a particular implementation. In the description provided herein, any references to operations performed by processing unit 108 and/or any implementation thereof may be understood to be performed by processor 114 based on instructions 116 stored in memory 112.

Figure 2:
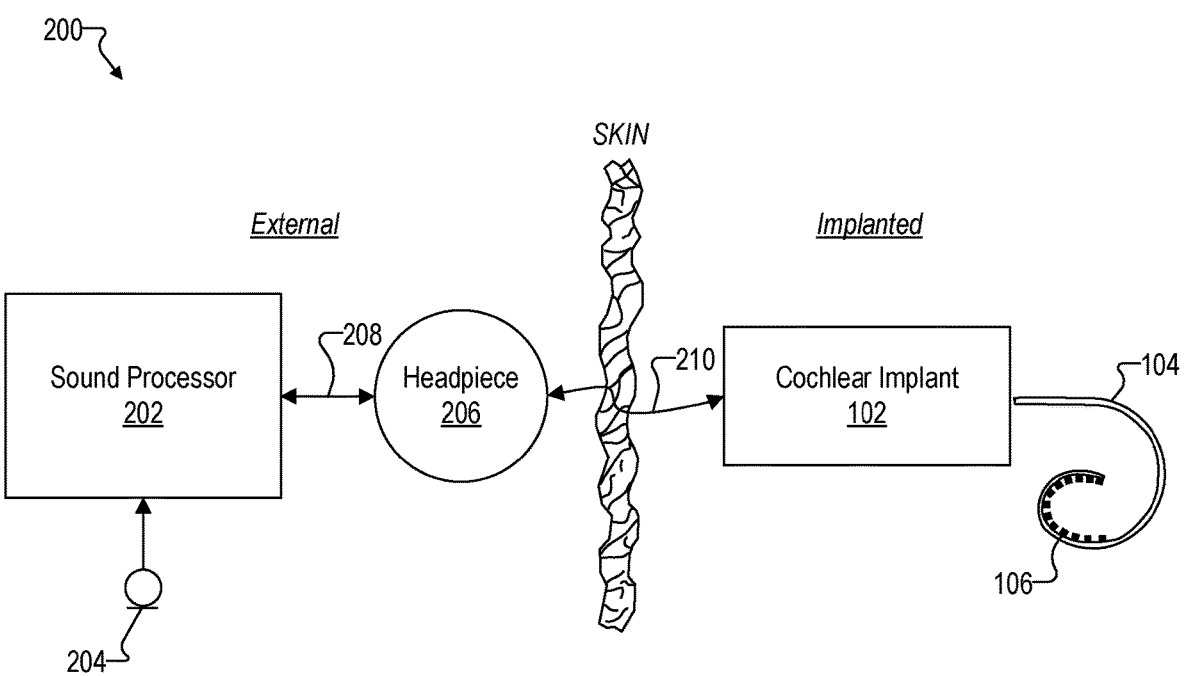
FIG. 2 shows an exemplary configuration of the cochlear implant system of FIG. 1.

Processing unit 108 may be implemented by one or more devices configured to interface with cochlear implant 102. To illustrate, FIG. 2 shows an exemplary configuration 200 of cochlear implant system 100 in which processing unit 108 is implemented by a sound processor 202 configured to be located external to the recipient. In configuration 200, sound processor 202 is communicatively coupled to a microphone 204 and to a headpiece 206 that are both configured to be located external to the recipient.

Sound processor 202 may be implemented by any suitable device that may be worn or carried by the recipient. For example, sound processor 202 may be implemented by a behind-the-ear ("BTE") unit configured to be worn behind and/or on top of an ear of the recipient. Additionally or alternatively, sound processor 202 may be implemented by an off-the-ear unit (also referred to as a body worn device) configured to be worn or carried by the recipient away from the ear. Additionally or alternatively, at least a portion of sound processor 202 is implemented by circuitry within headpiece 206.

Microphone 204 is configured to detect one or more audio signals (e.g., that include speech and/or any other type of sound) in an environment of the recipient. Microphone 204 may be implemented in any suitable manner. For example, microphone 204 may be implemented by a microphone that is configured to be placed within the concha of the ear near the entrance to the ear canal, such as a T-MIC™ microphone from Advanced Bionics. Such a microphone may be held within the concha of the ear near the entrance of the ear canal during normal operation by a boom or stalk that is attached to an ear hook configured to be selectively attached to sound processor 202. Additionally or alternatively, microphone 204 may be implemented by one or more microphones in or on headpiece 206, one or more microphones in or on a housing of sound processor 202, one or more beam-forming microphones, and/or any other suitable microphone as may serve a particular implementation.

Headpiece 206 may be selectively and communicatively coupled to sound processor 202 by way of a communication link 208 (e.g., a cable or any other suitable wired or wireless communication link), which may be implemented in any suitable manner. Headpiece 206 may include an external antenna (e.g., a coil and/or one or more wireless communication components) configured to facilitate selective wireless coupling of sound processor 202 to cochlear implant 102. Headpiece 206 may additionally or alternatively be used to selectively and wirelessly couple any other external device to cochlear implant 102. To this end, headpiece 206 may be configured to be affixed to the recipient's head and positioned such that the external antenna housed within headpiece 206 is communicatively coupled to a corresponding implantable antenna (which may also be implemented by a coil and/or one or more wireless communication components) included within or otherwise connected to cochlear implant 102. In this manner, stimulation parameters and/or power signals may be wirelessly and transcutaneously transmitted between sound processor 202 and cochlear implant 102 by way of a wireless communication link 210.

In configuration 200, sound processor 202 may receive an audio signal detected by microphone 204 by receiving a signal (e.g., an electrical signal) representative of the audio signal from microphone 204. Sound processor 202 may additionally or alternatively receive the audio signal by way of any other suitable interface as described herein. Sound processor 202 may process the audio signal in any of the ways described herein and transmit, by way of headpiece 206, stimulation parameters to cochlear implant 102 to direct cochlear implant 102 to apply electrical stimulation representative of the audio signal to the recipient.

In an alternative configuration, sound processor 202 may be implanted within the recipient instead of being located external to the recipient. In this alternative configuration, which may be referred to as a fully implantable configuration of cochlear implant system 100, sound processor 202 and cochlear implant 102 may be combined into a single device or implemented as separate devices configured to communicate one with another by way of a wired and/or wireless communication link. In a fully implantable implementation of cochlear implant system 100, headpiece 206 may not be included and microphone 204 may be implemented by one or more microphones implanted within the recipient, located within an ear canal of the recipient, and/or external to the recipient.

Figure 3:
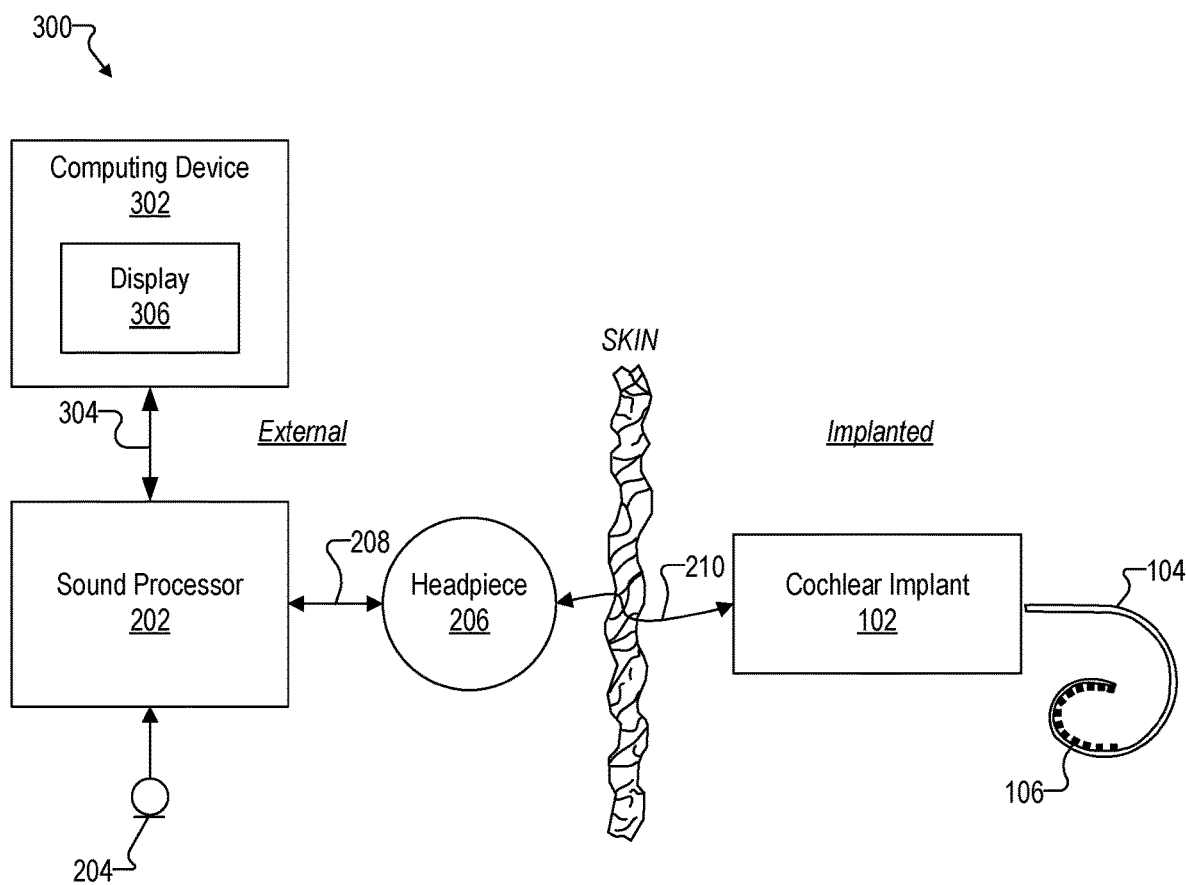
FIG. 3 shows another exemplary configuration of the cochlear implant system of FIG. 1.

FIG. 3 shows an exemplary configuration 300 of cochlear implant system 100 in which processing unit 108 is implemented by a combination of sound processor 202 and a computing device 302 configured to communicatively couple to sound processor 202 by way of a communication link 304, which may be implemented by any suitable wired or wireless communication link.

Computing device 302 may be implemented by any suitable combination of hardware and software. To illustrate, computing device 302 may be implemented by a mobile device (e.g., a mobile phone; a laptop, a tablet computer, etc.), a desktop computer, and/or any other suitable computing device as may serve a particular implementation. As an example, computing device 302 may be implemented by a mobile device configured to execute an application (e.g., a "mobile app") that may be used by a user (e.g., the recipient, a clinician, and/or any other user) to control one or more settings of sound processor 202 and/or cochlear implant 102 and/or perform one or more operations (e.g., diagnostic operations) with respect to data generated by sound processor 202 and/or cochlear implant 102.

In some examples, computing device 302 may be configured to control an operation of cochlear implant 102 by transmitting one or more commands to cochlear implant 102 by way of sound processor 202. Likewise, computing device 302 may be configured to receive data generated by cochlear implant 102 by way of sound processor 202. Alternatively, computing device 302 may interface with (e.g., control and/or receive data from) cochlear implant 102 directly by way of a wireless communication link between computing device 302 and cochlear implant 102. In some implementations in which computing device 302 interfaces directly with cochlear implant 102, sound processor 202 may or may not be included in cochlear implant system 100.

Computing device 302 is shown as having an integrated display 306. Display 306 may be implemented by a display screen, for example, and may be configured to display content generated by computing device 302. Additionally or alternatively; computing device 302 may be communicatively coupled to an external display device (not shown) configured to display the content generated by computing device 302.

In some examples, computing device 302 represents a fitting device configured to be selectively used (e.g., by a clinician) to fit sound processor 202 and/or cochlear implant 102 to the recipient. In these examples, computing device 302 may be configured to execute a fitting program configured to set one or more operating parameters of sound processor 202 and/or cochlear implant 102 to values that are optimized for the recipient. As such, in these examples, computing device 302 may not be considered to be part of cochlear implant system 100. Instead, computing device 302 may be considered to be separate from cochlear implant system 100 such that computing device 302 may be selectively coupled to cochlear implant system 100 when it is desired to fit sound processor 202 and/or cochlear implant 102 to the recipient.

Figure 4:
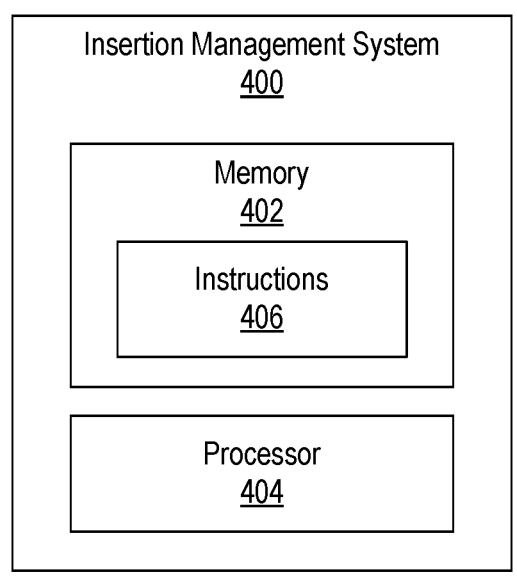
FIG. 4 shows an exemplary insertion management system.

Systems and methods described herein are configured to provide assistance for a lead insertion procedure during which an electrode lead (e.g., electrode lead 104) is inserted into a cochlea of a cochlear implant recipient. To illustrate, FIG. 4 shows an exemplary insertion management system 400 ("system 400"). System 400 may be implemented by one or more computing devices, such as any of the computing devices described herein (e.g., processing unit 108, sound processor 202, and/or computing device 302) and/or any computing device not included in cochlear implant system 100. For example, system 400 may be implemented by one or more computing devices accessible by a user before and/or during a lead insertion procedure and/or one or more servers located remote from an intraoperative space associated with the lead insertion procedure. System 400 may be maintained and/or otherwise associated with a manufacturer of cochlear implant systems, a provider of cochlear implant systems, a surgical center where lead insertion procedures are performed, and/or any other entity as may serve a particular implementation.

As shown, system 400 includes a memory 402 and a processor 404 configured to be selectively and communicatively coupled to one another. In some examples, memory 402 and processor 404 may be distributed between multiple devices and/or multiple locations as may serve a particular implementation.

Memory 402 may be implemented by any suitable non-transitory computer-readable medium and/or non-transitory processor-readable medium, such as any combination of non-volatile storage media and/or volatile storage media as described herein.

Memory 402 may maintain (e.g., store) executable data used by processor 404 to perform one or more of the operations described herein as being performed by system 400. For example, memory 402 may store instructions 406 that may be executed by processor 404 to perform any of the machine learning model operations described herein. Instructions 406 may be implemented by any suitable application, program, software, code, and/or other executable data instance. Memory 402 may also maintain any data received, generated, managed, used, and/or transmitted by processor 404.

Processor 404 may be configured to perform (e.g., execute instructions 406 stored in memory 402 to perform) various operations with respect to providing assistance for a lead insertion procedure. In the description provided herein, any references to operations performed by system 400 and/or any implementation thereof may be understood to be performed by processor 404 based on instructions 406 stored in memory 402.

Figure 5:
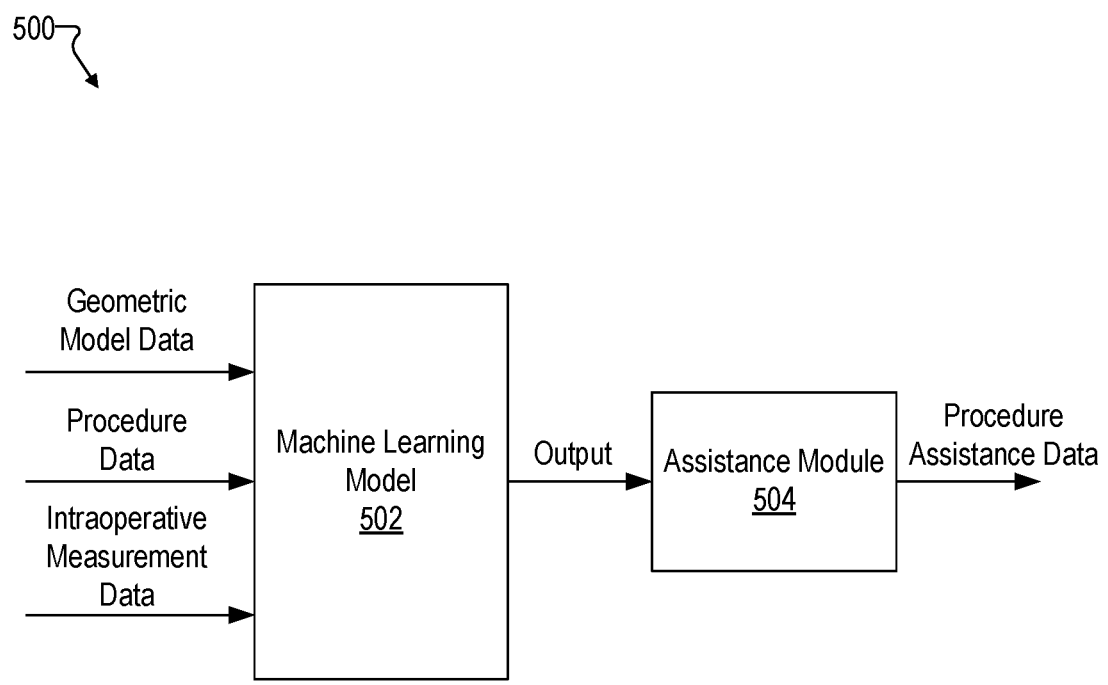
FIG. 5 shows an exemplary configuration in which the insertion management system of FIG. 4 uses a machine learning model and an assistance module to provide assistance for a lead insertion procedure.

FIG. 5 shows an exemplary configuration 500 in which system 400 uses a machine learning model 502 and an assistance module 504 to provide assistance for a lead insertion procedure.

Machine learning model 502 may be configured to perform any suitable machine learning heuristic (also referred to as artificial intelligence heuristic) with respect to various types of input data, which are described herein. Machine learning model 502 may be supervised and/or unsupervised as may serve a particular implementation and may be configured to implement one or more decision tree learning algorithms, association rule learning algorithms, artificial neural network learning algorithms, deep learning algorithms, bitmap algorithms, and/or any other suitable data analysis technique as may serve a particular implementation.

In some examples, machine learning model 502 is implemented by one or more neural networks, such as one or more deep convolutional neural networks (CNN) using internal memories of its respective kernels (filters), recurrent neural networks (RNN), and/or long/short term memory neural networks (LSTM). Machine learning model 502 may be multi-layer. For example, machine learning model 502 may be implemented by a neural network that includes an input layer, one or more hidden layers, and an output layer.

System 400 may access machine learning model 502 in any suitable manner. For example, system 400 may store data representative of machine learning model 502 in memory 402. Additionally or alternatively, as described herein, data representative of machine learning model 502 may be maintained by a system (e.g., one or more servers or other computing devices) remote from system 400. In these examples, system 400 may access machine learning model 502 by communicating with the remote system by way of a network.

As shown, system 400 may provide various types of data as inputs to machine learning model 502. For example, system 400 may be configured to provide geometric model data, procedure data, and intraoperative measurement data to machine learning model 502.

While all three types of data are shown in FIG. 5 to be provided as inputs to machine learning model 502, other combinations of data may be provided to machine learning model 502 as may serve a particular implementation. For example, in some examples, only geometric model data and procedure data may be provided to machine learning model 502 as inputs. Additional or alternative types of data may be provided as inputs to machine learning model 502 as may serve a particular implementation.

Moreover, while data is shown in FIG. 5 as being input directly into machine learning model 502, in some alternative examples, data may be input into machine learning model 502 by way of a feature extractor configured to extract one or more features that are input into machine learning model 502.

The geometric model data input into machine learning model 502 may be specific to the recipient of the cochlear implant and may be representative of a geometrical model (also referred to as a statistical shape model or an active shape model) of a cochlea of the recipient.

The geometric model data may be generated in any suitable manner. For example, system 400 and/or any other computing device may be configured to generate the geometric model based on one or more preoperative images of the recipient's cochlea. Such preoperative images may be acquired using computerized tomography (CT) scans, a digital volume tomography (DVT) system, magnetic resonance imaging (MRI), ultrasound imaging, and/or any other suitable medical imaging technique. In some examples, system 400 may generate the geometric model data by fitting high-resolution model data onto these acquired images such that the geometric model data represents a high resolution representation of the cochlea of the particular recipient. System 400 may use the geometric model data to display a high resolution virtual model of the cochlea that may be interacted with by a user before and during the lead insertion procedure. As described herein, system 400 may also use the geometric model data to provide one or more recommendations associated with a lead insertion procedure.

The procedure data input into machine learning model 502 may be representative of one or more contextual attributes of the lead insertion procedure for the recipient. Each of these contextual attributes may affect an outcome of the lead insertion procedure. Various examples of contextual attributes that may be represented by procedure data will now be provided. It will be recognized that these examples are merely illustrative of the many different types of contextual attributes that may be represented by the procedure data as may serve a particular implementation.

In some examples, the procedure data may be representative of one or more characteristics (e.g., a make, model, type, size, flexibility rating, etc.) of the electrode lead being inserted into the cochlea and/or a tool being used to insert the electrode lead into the cochlea. In some examples, a user may have the option to use a variety of different electrode leads and/or tools during the lead insertion procedure. Each electrode lead and/or tool may have particular advantages depending on the particular recipient being implanted.

The procedure data may additionally or alternatively be representative of one or more characteristics of an opening in the recipient through which the electrode lead is to be inserted. For example, the procedure data may be representative of a location and/or a size of the opening.

The procedure data may additionally or alternatively be representative of an identity of a user performing or otherwise associated with the lead insertion procedure. For example, the procedure data may be representative of a user ID associated with a surgeon who performs the lead insertion procedure. This user ID may be used to access historical data associated with the user to determine one or more surgical tendencies of the user (e.g., electrode lead preferences, tool preferences, recipient positioning preferences, etc.). These tendencies may affect an outcome of the lead insertion procedure and/or affect how one or more parameters associated with the lead insertion procedure are optimized.

The procedure data may additionally or alternatively be representative of recipient-specific information. For example, the procedure data may be representative of a preoperative assessment (e.g., an audiogram) of a hearing profile of the recipient. This preoperative assessment may affect a manner in which the lead insertion procedure should optimally be performed. For example, if the preoperative assessment determines that the user has a relatively high range of residual hearing, system 400 may determine that a relatively shallow insertion depth should be used for the electrode lead.

The procedure data may additionally or alternatively be representative of an insertion depth for the electrode lead, an insertion speed at which the electrode lead is inserted into the cochlea, and/or or an insertion angle at which the electrode lead is inserted into the cochlea. Such data may be determined preoperatively (e.g., based on historical data associated with a particular user). Additionally or alternatively, such data may be determined in real time during the lead insertion procedure in any suitable manner.

The intraoperative measurement data input into machine learning model 502 may be representative of one or more intraoperative measurements performed with respect to the recipient during the lead insertion procedure.

For example, the intraoperative measurement data may be representative of a measurement of an evoked response elicited by stimulation (e.g., acoustic stimulation) of the recipient. Exemplary evoked responses include, but are not limited to, an electrocochleographic (ECochG) potential (e.g., a cochlear microphonic potential, a compound action potential such as an auditory nerve response, a summating potential, etc.), a brainstem response, a stapedius reflex, and/or any other type of neural or physiological response that may occur within a recipient in response to application of acoustic stimulation to the recipient. Evoked responses may originate from neural tissues, hair cell to neural synapses, inner or outer hair cells, and/or other sources.

The intraoperative measurement data may additionally or alternatively be representative of a measurement acquired by a sensor on the electrode lead. This sensor may include a force sensor, a pressure sensor, and/or any other type of sensor as may serve a particular implementation. For example, a force sensor and/or a pressure sensor may be configured to sense when the electrode lead is pressing against a wall of the cochlea.

The intraoperative measurement data may additionally or alternatively be representative of an ultrasound measurement, an optical sensor measurement, an electrical field sensor measurement, an electrode impedance measurement, and/or any other type of intraoperative measurement that may be performed by any suitable sensor and/or device.

Machine learning model 502 may be configured to process geometric model data, procedure data, intraoperative measurement data, and/or any other type of input data. Based on this processing, machine learning model 502 may provide an output that takes into account the input data. The output of machine learning model 502 may be in any suitable form and/or format.

Assistance module 504 may be implemented by any suitable combination of hardware and/or software of system 400. As shown, assistance module 504 may be configured to generate procedure assistance data based on the output of machine learning model 502. In some alternative examples, system 400 does not include a separate assistance module 504. Instead, the output of machine learning model 502 may constitute the procedure assistance data.

Figure 6:
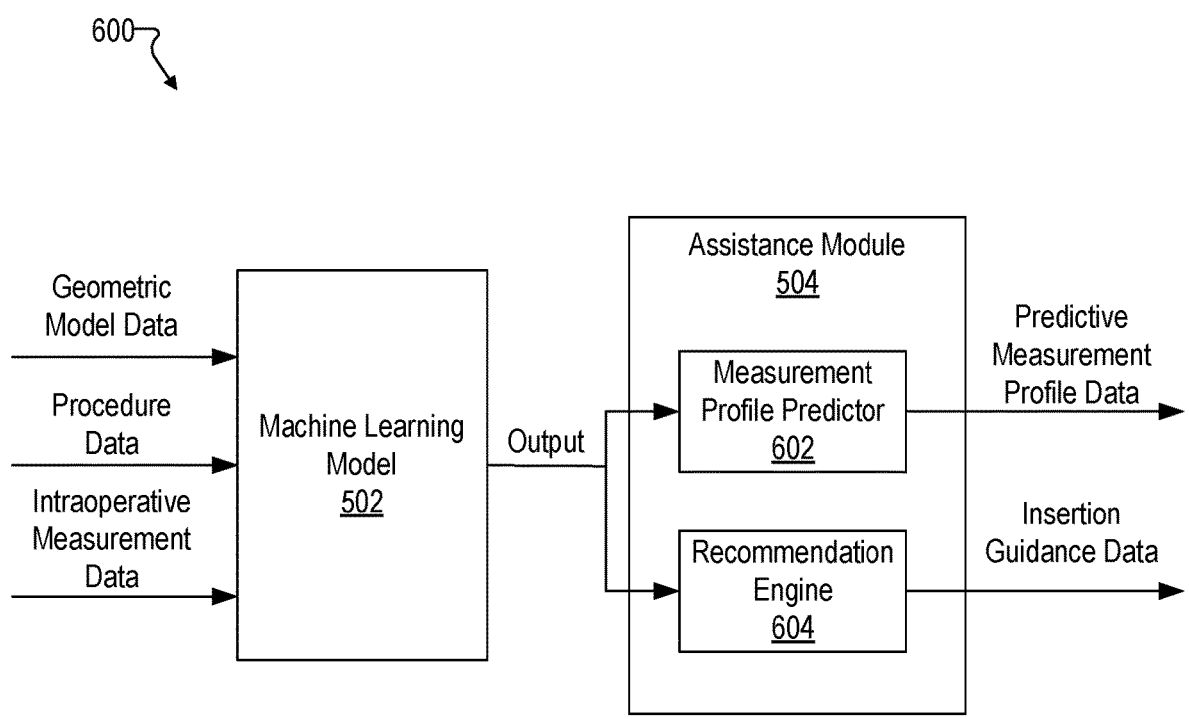
FIGS. 6-9 show exemplary implementations of the configuration of FIG. 5.

The procedure assistance data generated by system 400 (e.g., assistance module 504) may include any suitable data configured to assist a user in performing the lead insertion procedure. To illustrate, FIG. 6 shows an exemplary implementation 600 of configuration 500 in which assistance module 504 includes a measurement profile predictor 602 and a recommendation engine 604. Measurement profile predictor 602 and recommendation engine 604 may each be implemented by any suitable combination of hardware and/ or software.

As shown, measurement profile predictor 602 is configured to generate predictive measurement profile data based on the output of machine learning model 502. Recommendation engine 604 is configured to generate insertion guidance data based on the output of machine learning model 502. While FIG. 6 shows assistance module 504 outputting both predictive measurement profile data and insertion guidance data, it will be recognized that in some examples assistance module 504 may be configured to output only one of these types of data.

The predictive measurement profile data generated by measurement profile predictor 602 may be representative of a predicted intraoperative measurement profile for the recipient during the lead insertion procedure. The predicted intraoperative measurement profile may be representative of one or more predicted values for one or more intraoperative measurements that may be performed at any stage during the lead insertion procedure. For example, the predicted intraoperative measurement profile may include an evoked response profile, an electrode impedance profile, an electrical field imaging measurement profile, a force sensor measurement profile, a pressure sensor measurement profile, an ultrasound sensor measurement profile, an optical sensor measurement profile, and/or an electrical field sensor measurement profile.

The predicted intraoperative measurement profile may be based on the various inputs to machine learning model 502, As described herein, a user may use the predicted intraoperative measurement profile to plan and/or adjust an approach to performing the lead insertion procedure. Additionally or alternatively, system 400 may be configured to automatically set (e.g., initially set before the lead insertion procedure begins and/or adjust in real time during the lead insertion procedure) one or more parameters associated with the lead insertion procedure.

The insertion guidance data generated by recommendation engine 604 may be representative of one or more recommendations for performing the lead insertion procedure. For example, based on the output of machine learning model 502 that takes into account the various inputs to machine learning model 502, recommendation engine 604 may recommend a particular type of electrode lead and/or tool to be used during the lead insertion procedure, a particular insertion depth, speed, and/or angle that should be used during the lead insertion procedure, and/or any other action to be performed during the lead insertion procedure. For example, during the lead insertion procedure, recommendation engine 604 may make one or more recommendations configured to more closely align an actual intraoperative measurement profile for the recipient with the predicted intraoperative measurement profile generated by measurement profile predictor 602. As another example, the geometric model data for a particular recipient may indicate that the cochlea for the recipient is relatively small. Based on this data and on historical data, recommendation engine 604 may recommend a relatively shallow insertion depth, a particular insertion depth (e.g., a relatively shallow insertion depth), a particular insertion speed, a particular insertion angle, and/or a particular type of electrode lead that should be used during the lead insertion procedure.

Figure 7:
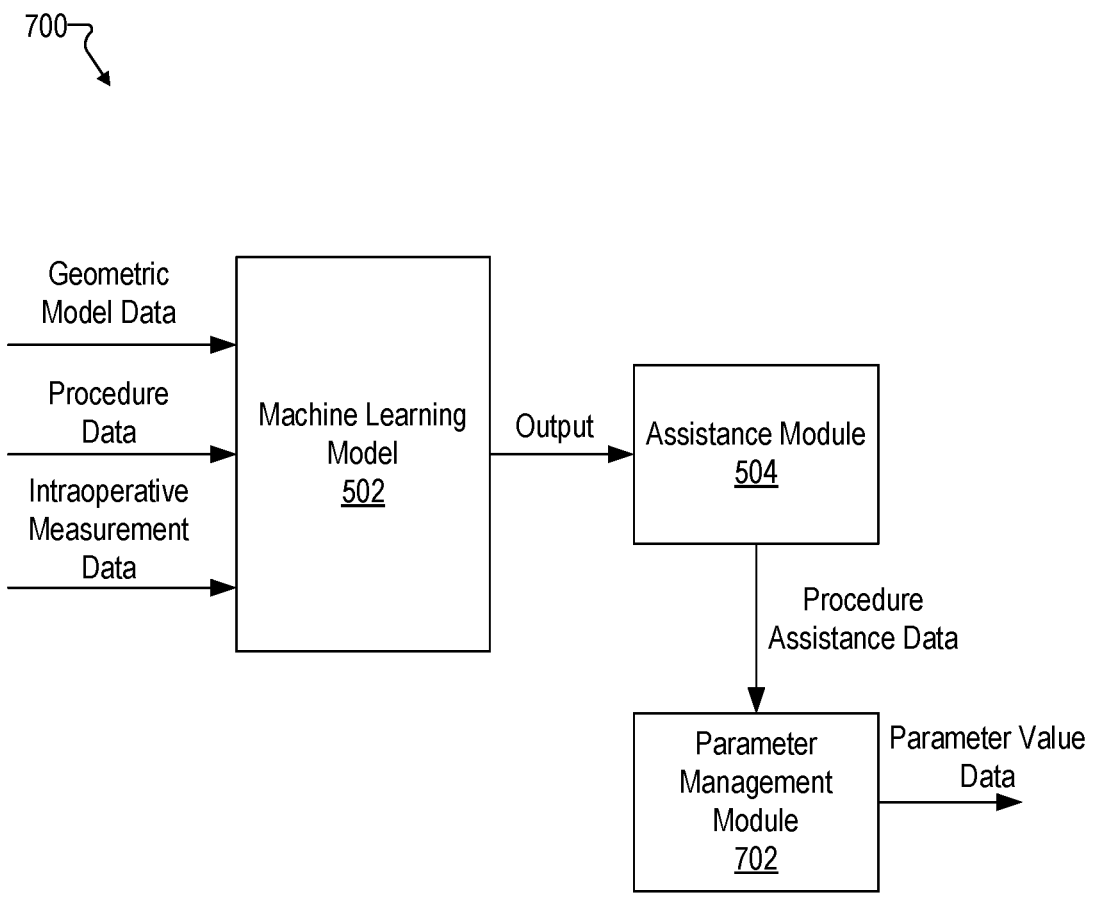

As mentioned, system 400 may be configured to set one or more parameters associated with the lead insertion procedure based on the procedure assistance data generated by assistance module 504. To illustrate, FIG. 7 shows an exemplary implementation 700 of configuration 500 in which system 400 further includes a parameter management module 702 configured to generate parameter value data based on the procedure assistance data generated by assistance module 504. Parameter management module 702 may be implemented by any suitable combination of hardware and/or software.

The parameter value data generated by parameter management module 702 may be representative of values for one or more parameters associated with the lead insertion procedure. For example, the parameter value data may be representative of values for an insertion depth for the electrode lead, an insertion speed at which the electrode lead is inserted into the cochlea, an insertion angle at which the electrode lead is inserted into the cochlea, and/or a characteristic of the electrode lead. System 400 may set (e.g. initially set before the lead insertion procedure begins and/or adjust in real time during the lead insertion procedure) values for any of these parameters in any suitable manner.

For example, a computer-assisted tool may be used to insert the electrode lead into the cochlea. The computer-assisted tool may operate in accordance with one or more parameters. In this example, parameter management module 702 may set a value for one or more these parameters based on the procedure assistance data generated by assistance module 504. In situations where the electrode lead is manually inserted into the cochlea by a user, the one or more parameters set by parameter management module 702 may be presented to the user in any suitable manner so that the user can ensure that the parameters are adhered to.

During the lead insertion procedure, parameter management module 702 may intraoperatively adjust values for these parameters based on the output of machine learning model 502. For example, parameter management module 702 may access intraoperative measurement data representative of an actual intraoperative measurement performed with respect to the recipient during the lead insertion procedure and compare the intraoperative measurement data with the predictive measurement profile data generated by measurement profile predictor 602. Based on this comparison, parameter management module 702 may intraoperatively adjust one or more parameters (e.g., so that the actual intraoperative measurement data more closely aligns with the predictive measurement profile data).

Figure 8:
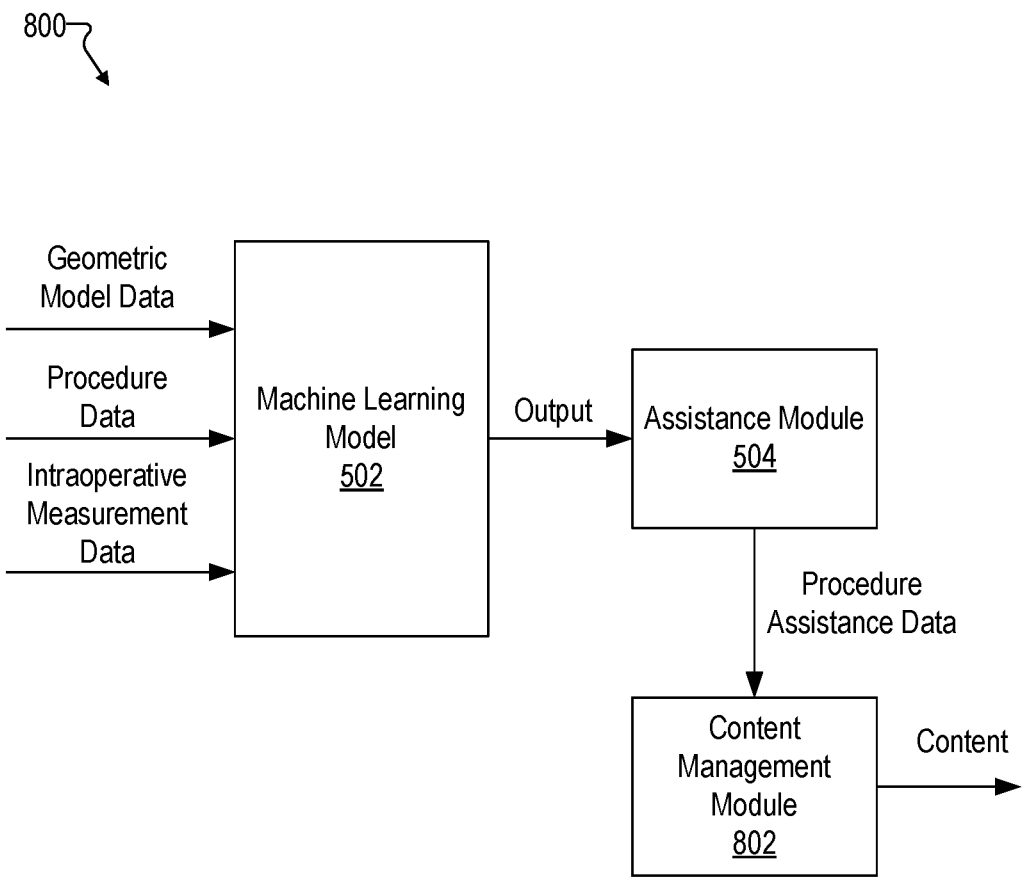

FIG. 8 shows an exemplary implementation 800 of configuration 500 in which system 400 further includes a content management module 802 configured to generate content associated with the procedure assistance data generated by assistance module 504. The content may include any graphical content, audible content, and/or any other suitable type of content that may be associated with (e.g., representative of) the procedure assistance data.

Content management module 802 may be further configured to present the content to a user performing the lead insertion procedure. This may be performed in any suitable manner.

Figure 9:
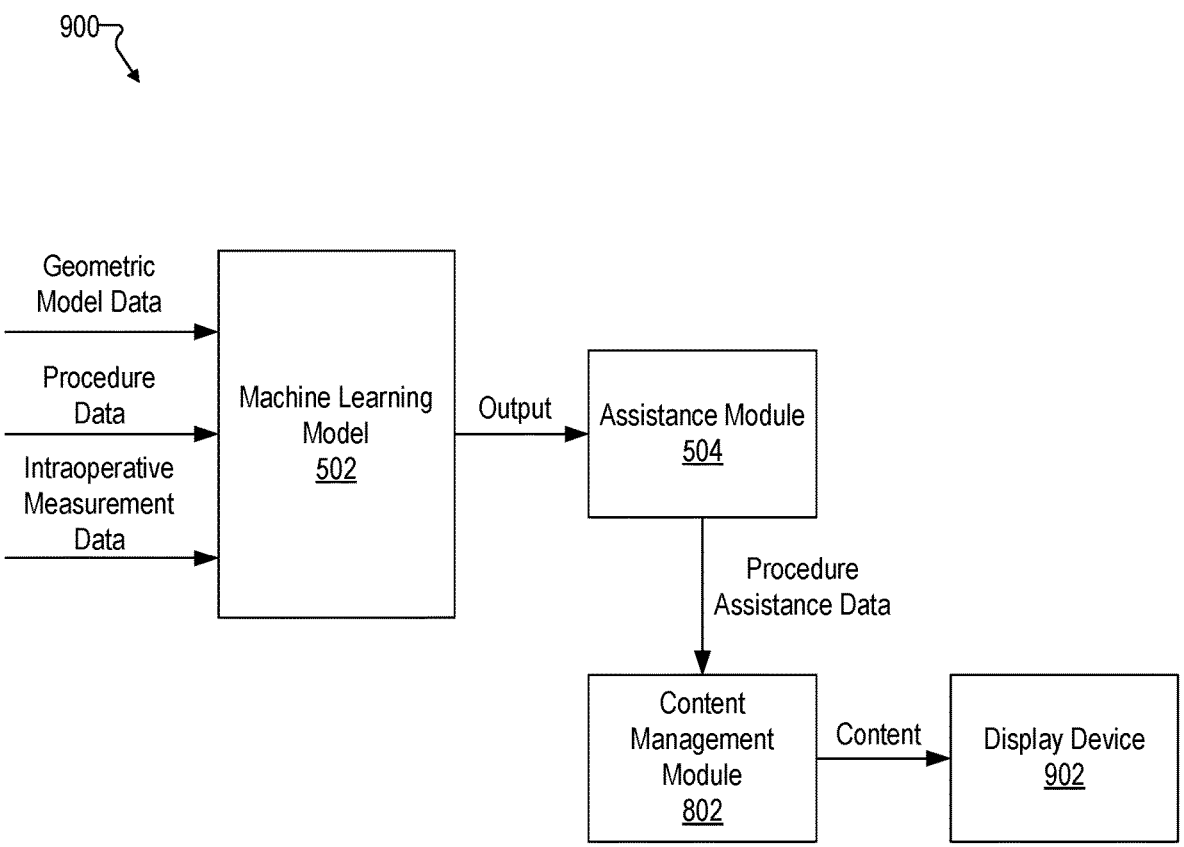

For example, FIG. 9 shows an exemplary implementation 900 in which content management module 802 is configured to display the content within a graphical user interface displayed by a display device 902. Display device 902 may be implemented by any suitable display screen, monitor, and/or other device configured to display graphical content. For example, display device 902 may be implemented by a display screen integrated into one or more lenses of a surgical microscope used by a user to perform the lead insertion procedure. In this example, content management module 802 may be configured to project the content onto the one or more lenses of the surgical microscope.

Figure 10:
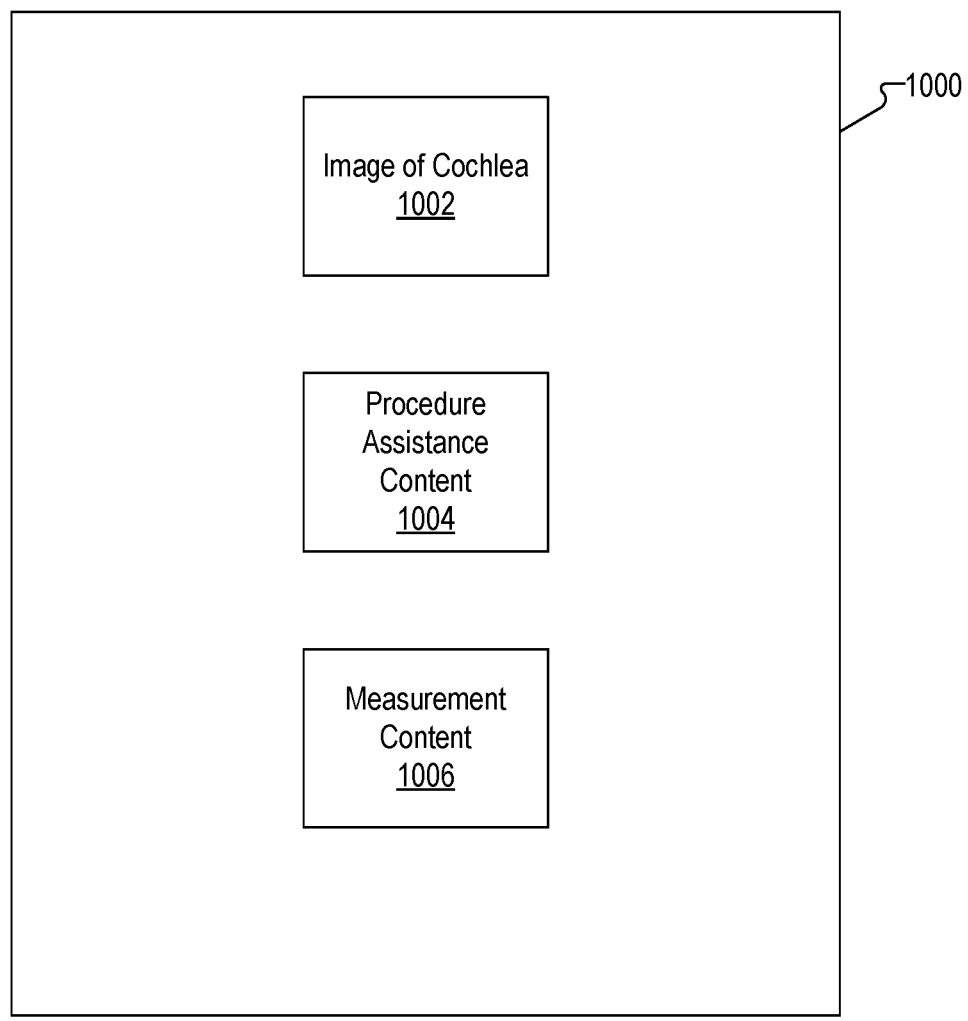
FIG. 10 shows an exemplary graphical user interface.

In some examples, content management module 802 may be configured to generate an image of the cochlea based on the geometric model data and present the image of the cochlea together with the content. For example, FIG. 10 shows an exemplary graphical user interface 1000 that may be presented by way of one or more display devices. As shown, graphical user interface 1000 includes an image of a cochlea 1002 generated based on the geometric model data, procedure assistance content 1004 representative of content associated with procedure assistance data, and measurement content 1006 associated with one or more intraoperative measurements performed during the lead insertion procedure. Image of cochlea 1002 may, in some cases, include a virtual representation of the cochlea in two dimensions (2D) or three dimensions (3D). In some examples, the user may interact with the virtual representation to ascertain locations of various intracochlear features and/or otherwise inspect the cochlea before and/or during the lead insertion procedure.

By concurrently displaying different types of content, such as shown in graphical user interface 1000, system 400 may allow a user to more easily access information that will assist the user in optimizing the lead insertion procedure.

Content management module 802 may be additionally or alternatively configured to present the content in any other suitable manner. For example, content management module 802 may be configured to provide audible feedback representative of one or more recommendations for the user during the lead insertion procedure.

While individual modules have been shown connection with FIGS. 5-9 and described in as performing separate functions, it will be recognized that one or more of the modules may be combined into a single module. In alternative embodiments machine learning model 502 may be configured to perform any of the functions described herein is being performed by the various modules.

Figure 11:
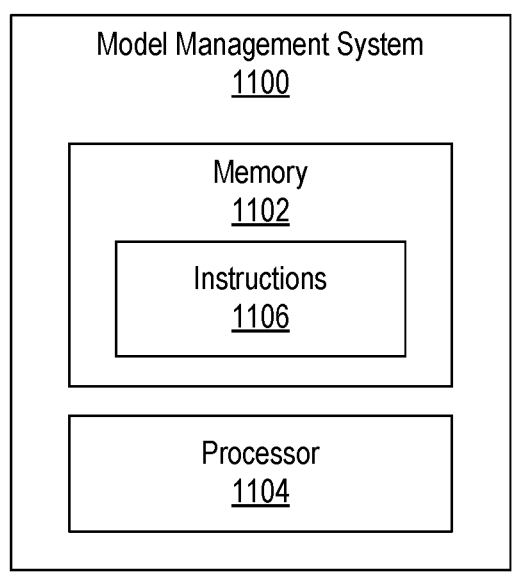
FIG. 11 shows an exemplary model management system.

FIG. 11 shows an exemplary model management system 1100 ("system 1100"). System 1100 may be implemented by one or more computing devices (e.g., servers). In some examples, system 1100 is remote from system 400. Alternatively, system 1100 and system 400 may be integrated into a single system. System 1100 may be implemented by one or more computing devices maintained and/or otherwise associated with a manufacturer of cochlear implant systems, a provider of cochlear implant systems, and/or any other entity as may serve a particular implementation.

As shown, system 1100 includes a memory 1102 and a processor 1104 configured to be selectively and communicatively coupled to one another. In some examples, memory 1102 and processor 1104 may be distributed between multiple devices and/or multiple locations as may serve a particular implementation.

Memory 1102 may be implemented by any suitable non-transitory computer-readable medium and/or non-transitory processor-readable medium, such as any combination of non-volatile storage media and/or volatile storage media as described herein.

Memory 1102 may maintain (e.g., store) executable data used by processor 1104 to perform one or more of the operations described herein as being performed by system 1100. For example, memory 1102 may store instructions 1106 that may be executed by processor 1104 to perform any of the machine learning model maintenance and training operations described herein. Instructions 1106 may be implemented by any suitable application, program, software, code, and/or other executable data instance. Memory 1102 may also maintain any data received, generated, managed, used, and/or transmitted by processor 1104.

Processor 1104 may be configured to perform (e.g., execute instructions 1106 stored in memory 1102 to perform) various operations with respect to maintaining and training a machine learning model (e.g., machine learning model 502). In the description provided herein, any references to operations performed by system 1100 and/or any implementation thereof may be understood to be performed by processor 1104 based on instructions 1106 stored in memory 1102.

System 1100 may be configured to access data representative of a machine learning model (e.g., machine learning model 502) for use during a lead insertion procedure in which an electrode lead is inserted into a cochlea of a recipient. For example, system 1100 itself may maintain the machine learning model data. Additionally or alternatively, system 1100 may access the machine learning model data by communicating with a separate system that maintains the machine learning model data.

Figure 12:
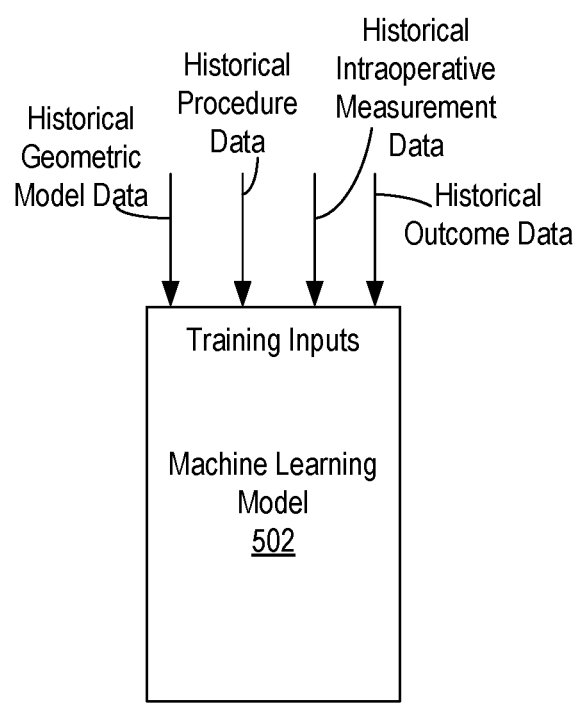
FIG. 12 shows an exemplary configuration in which the model management system of FIG. 11 is configured to provide various types of data as training inputs to a machine learning model.

System 1100 may be further configured to train the machine learning model. This may be performed in any suitable manner. For example, FIG. 12 shows an exemplary configuration 1200 in which system 1100 is configured to provide various types of data as training inputs to machine learning model 502. As shown, system 1100 may provide historical geometric model data, historical procedure data, historical intraoperative measurement data, and historical outcome data as training inputs to machine learning model 502. While FIG. 12 shows all of these types of data being provided as training inputs to machine learning model 502, it will be recognized that in alternative embodiments other combinations of these data and/or other data may be provided as training inputs. For example, in one embodiment, only the historical geometric model data, the historical procedure data, and the historical outcome data may be provided as training inputs to machine learning model 502.

Each of the historical data training inputs shown in FIG. 12 may correspond to a plurality of cochlear implant recipients and lead insertion procedures. For example, each of the historical data training inputs may include data collected over a period of time (e.g., years) of the insertion procedures for various cochlear implant recipients at one or more clinics and as performed by one or more users (e.g., surgeons). For example, the historical geometric model data may be representative of geometrical models of cochleas of a plurality of cochlear implant recipients, the historical procedure data may be representative of contextual attributes of a plurality of lead insertion procedures in which electrode leads are inserted to the cochleas of the cochlear implant recipients, the historical intraoperative measurement data may be representative of intraoperative measurements performed with respect to the cochlear implant recipients during the lead insertion procedures, and the historical outcome data may be representative of subjective and/or objective outcomes of the lead insertion procedures. Based on this training data, machine learning model 502 may learn how various combinations of factors related to a lead insertion procedure may combine to affect an outcome of the lead insertion procedure.

In some examples, system 400 may be configured to generate the historical procedure data by applying an image processing heuristic to images (e.g., video) acquired during the lead insertion procedures to identify the contextual attributes. For example, an image processing heuristic may be used to determine insertion depths, speed, and/or angles of the various lead insertion procedures.

Figure 13:
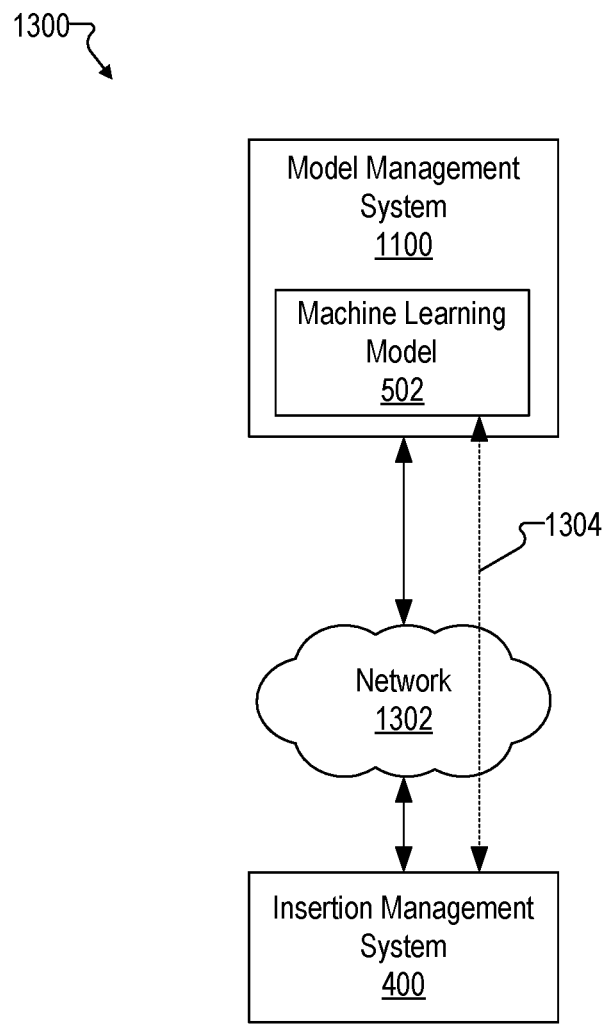
FIG. 13 shows an exemplary configuration in which systems are interconnected by a network.

FIG. 13 shows an exemplary configuration 1300 in which system 400 and system 1100 are interconnected by a network 1302. Network 1302 may be implemented by a local area network, a wireless network (e.g., Wi-Fi), a wide area network, the Internet, a cellular data network, and/or any other suitable network. Data may flow between components connected to network 1302 using any communication technologies, devices, media, and protocols as may serve a particular implementation.

In FIG. 13, system 1100 is configured to maintain machine learning model 502. System 400 may be configured to access machine learning model 502 by way of a communication link 1304 facilitated by network 1302. Communication link 1304 may be wired and/or wireless as may serve a particular implementation.

Figure 14:
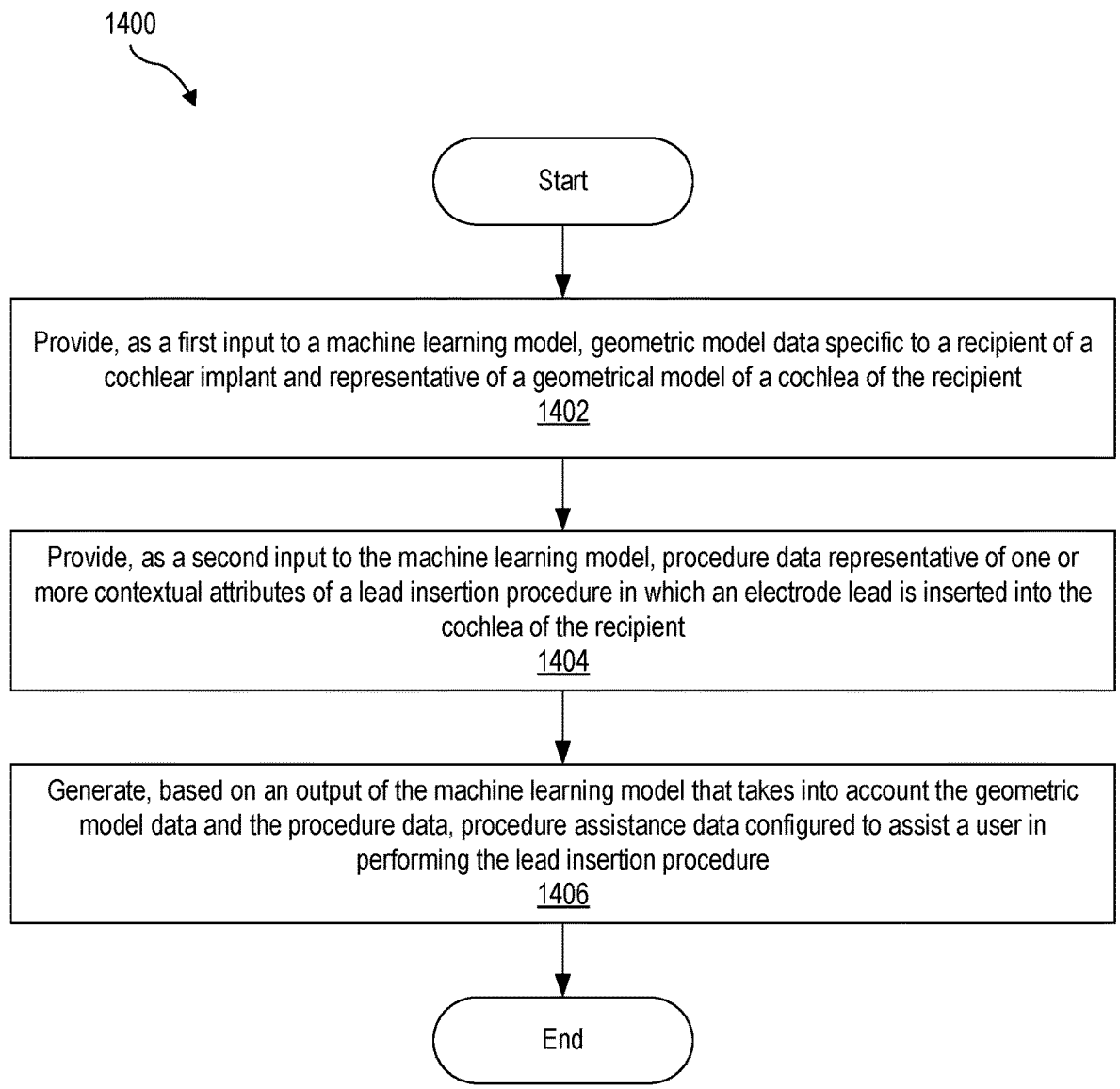
FIG. 14 illustrates an exemplary method.

FIG. 14 illustrates an exemplary method 1400 that may be performed by an insertion management system (e.g., system 400 or any implementation thereof, such as at least one computing device). While FIG. 14 illustrates exemplary operations according to one embodiment, other embodiments may omit, add to, reorder, and/or modify any of the operations shown in FIG. 14. Each of the operations shown in FIG. 14 may be performed in any of the ways described herein.

At operation 1402, an insertion management system provides, as a first input to a machine learning model, geometric model data specific to a recipient of a cochlear implant and representative of a geometrical model of a cochlea of the recipient.

At operation 1404, the insertion management system provides, as a second input to the machine learning model, procedure data representative of one or more contextual attributes of a lead insertion procedure in which an electrode lead is inserted to the cochlea of the recipient.

At operation 1406, the insertion management system generates, based on an output of the machine learning model that takes into account the geometric model data and the procedure data, procedure assistance data configured to assist a user in performing the lead insertion procedure.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 15:
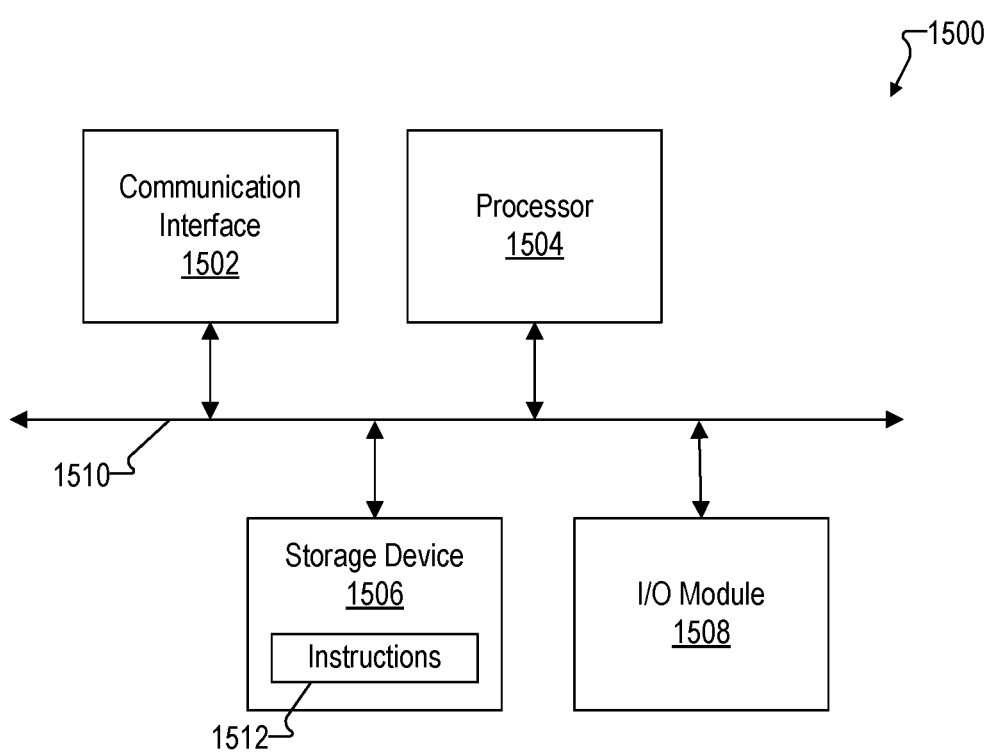
FIG. 15 illustrates an exemplary computing device.

FIG. 15 illustrates an exemplary computing device 1500 that may be specifically configured to perform one or more of the processes described herein. To that end, any of the systems, processing units, and/or devices described herein may be implemented by computing device 1500.

As shown in FIG. 15, computing device 1500 may include a communication interface 1502, a processor 1504, a storage device 1506, and an input/output ("I/O") module 1508 communicatively connected one to another via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data and/or interpreting, executing, and/or directing execution of one or more of the instructions, processes, and/or operations described herein. Processor 1504 may perform operations by executing computer-executable instructions 1512 (e.g., an application, software, code, and/or other executable data instance) stored in storage device 1506.

Storage device 1506 may include one or more data storage media, devices, or configurations and may employ any type, form, and combination of data storage media and/or device. For example, storage device 1506 may include, but is not limited to, any combination of the non-volatile media and/or volatile media described herein. Electronic data, including data described herein, may be temporarily and/or permanently stored in storage device 1506. For example, data representative of computer-executable instructions 1512 configured to direct processor 1504 to perform any of the operations described herein may be stored within storage device 1506. In some examples, data may be arranged in one or more databases residing within storage device 1506.

I/O module 1508 may include one or more I/O modules configured to receive user input and provide user output. I/O module 1508 may include any hardware, firmware, software, or combination thereof supportive of input and output capabilities. For example, I/O module 1508 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a memory storing instructions;
a processor communicatively coupled to the memory and configured to execute the instructions to:
provide, as a first input to a machine learning model, geometric model data specific to a recipient of a cochlear implant and representative of a geometrical model of a cochlea of the recipient;
provide, as a second input to the machine learning model, procedure data representative of one or more contextual attributes of a lead insertion procedure in which an electrode lead is inserted to the cochlea of the recipient;
generate, based on an output of the machine learning model that takes into account the geometric model data and the procedure data, procedure assistance data configured to assist a user in performing the lead insertion procedure; and
set, based on the procedure assistance data, one or more parameters associated with the lead insertion procedure, wherein the setting comprises intraoperatively adjusting the one or more parameters during the lead insertion procedure.

2. The system of claim 1, wherein the procedure assistance data comprises one or more of predictive measurement profile data representative of a predicted intraoperative measurement profile for the recipient during the lead insertion procedure or insertion guidance data representative of one or more recommendations for performing the lead insertion procedure.

3. The system of claim 1, wherein:
the processor is further configured to execute the instructions to provide, as a third input to the machine learning model, intraoperative measurement data representative of one or more intraoperative measurements performed with respect to the recipient during the lead insertion procedure; and
the output of the machine learning model further takes into account the intraoperative measurement data.

4. The system of claim 3, wherein the one or more intraoperative measurements comprise one or more of a measurement of an evoked response elicited by stimulation of the recipient, a measurement acquired by a sensor on the electrode lead, an ultrasound measurement, an optical sensor measurement, or an electrical field sensor measurement.

5. The system of claim 1, wherein the setting of the one or more parameters further comprises setting one or more of an insertion depth for the electrode lead, an insertion speed at which the electrode lead is inserted into the cochlea, an insertion angle at which the electrode lead is inserted into the cochlea, or a characteristic of the electrode lead.

6. The system of claim 1, wherein:
the procedure assistance data comprises predictive measurement profile data representative of a predicted intraoperative measurement profile for the recipient during the lead insertion procedure;
the processor is further configured execute the instructions to
access intraoperative measurement data representative of an actual intraoperative measurement performed with respect to the recipient during the lead insertion procedure, and
compare the intraoperative measurement data with the predictive measurement profile data; and
the intraoperatively adjusting of the one or more parameters is based on the comparing of the intraoperative measurement data with the predictive measurement profile data.

7. The system of claim 1, wherein the one or more contextual attributes of the lead insertion procedure comprise one or more characteristics of the electrode lead, one or more characteristics of a tool being used to insert the electrode lead into the cochlea, one or more characteristics of an opening in the recipient through which the electrode lead is to be inserted, an identity of a user performing the lead insertion procedure, a surgical tendency of the user performing the lead insertion procedure, a preoperative assessment of a hearing profile of the recipient, an insertion depth for the electrode lead, an insertion speed at which the electrode lead is inserted into the cochlea, or an insertion angle at which the electrode lead is inserted into the cochlea.

8. The system of claim 1, wherein the processor is further configured to execute the instructions to generate, based on one or more images of the cochlea, the geometric model data.

9. The system of claim 1, wherein the processor is further configured to execute the instructions to:
generate content associated with the procedure assistance data; and
present the content to a user performing the lead insertion procedure.

10. The system of claim 9, wherein the presenting of the content comprises displaying the content within a graphical user interface.

11. The system of claim 10, wherein the displaying of the content comprises projecting the content onto one or more lenses of a surgical microscope.

12. The system of claim 9, wherein the processor is further configured to execute the instructions to:
generate an image of the cochlea based on the geometric model data; and
present the image of the cochlea together with the content.

13. The system of claim 1, wherein the machine learning model is trained by:
applying, as a first training input to the machine learning model, historical geometric model data for a plurality of cochlear implant recipients and representative of geometrical models of cochleas of the plurality of cochlear implant recipients;
applying, as a second training input to the machine learning model, historical procedure data representative of contextual attributes of a plurality of lead insertion procedures in which electrode leads are inserted to the cochleas of the plurality of cochlear implant recipients; and
applying, as a third training input to the machine learning model, outcome data representative of outcomes of the plurality of lead insertion procedures.

14. The system of claim 13, wherein the machine learning model is further trained by applying, as a fourth training input to the machine learning model, historical intraoperative measurement data representative of one or more intraoperative measurements performed with respect to the plurality of cochlear implant recipients during the plurality of lead insertion procedures.

15. The system of claim 1, wherein the processor is configured to access the machine learning model by storing data representative of the machine learning model in the memory.

16. The system of claim 1, wherein:
data representative of the machine learning model is maintained by a model management system communicatively coupled to the system by way of a network; and
the processor is configured to access the machine learning model by communicating with the model management system by way of the network.

17. A method comprising:
providing, by an insertion management system and as a first input to a machine learning model, geometric model data specific to a recipient of a cochlear implant and representative of a geometrical model of a cochlea of the recipient;
providing, by the insertion management system and as a second input to the machine learning model, procedure data representative of one or more contextual attributes of a lead insertion procedure in which an electrode lead is inserted to the cochlea of the recipient; and
generating, by the insertion management system and based on an output of the machine learning model that takes into account the geometric model data and the procedure data, procedure assistance data configured to assist a user in performing the lead insertion procedure; and
setting, by the insertion management system and based on the procedure assistance data, one or more parameters associated with the lead insertion procedure, wherein the setting comprises intraoperatively adjusting the one or more parameters during the lead insertion procedure.

* * * * *